Figure 1:
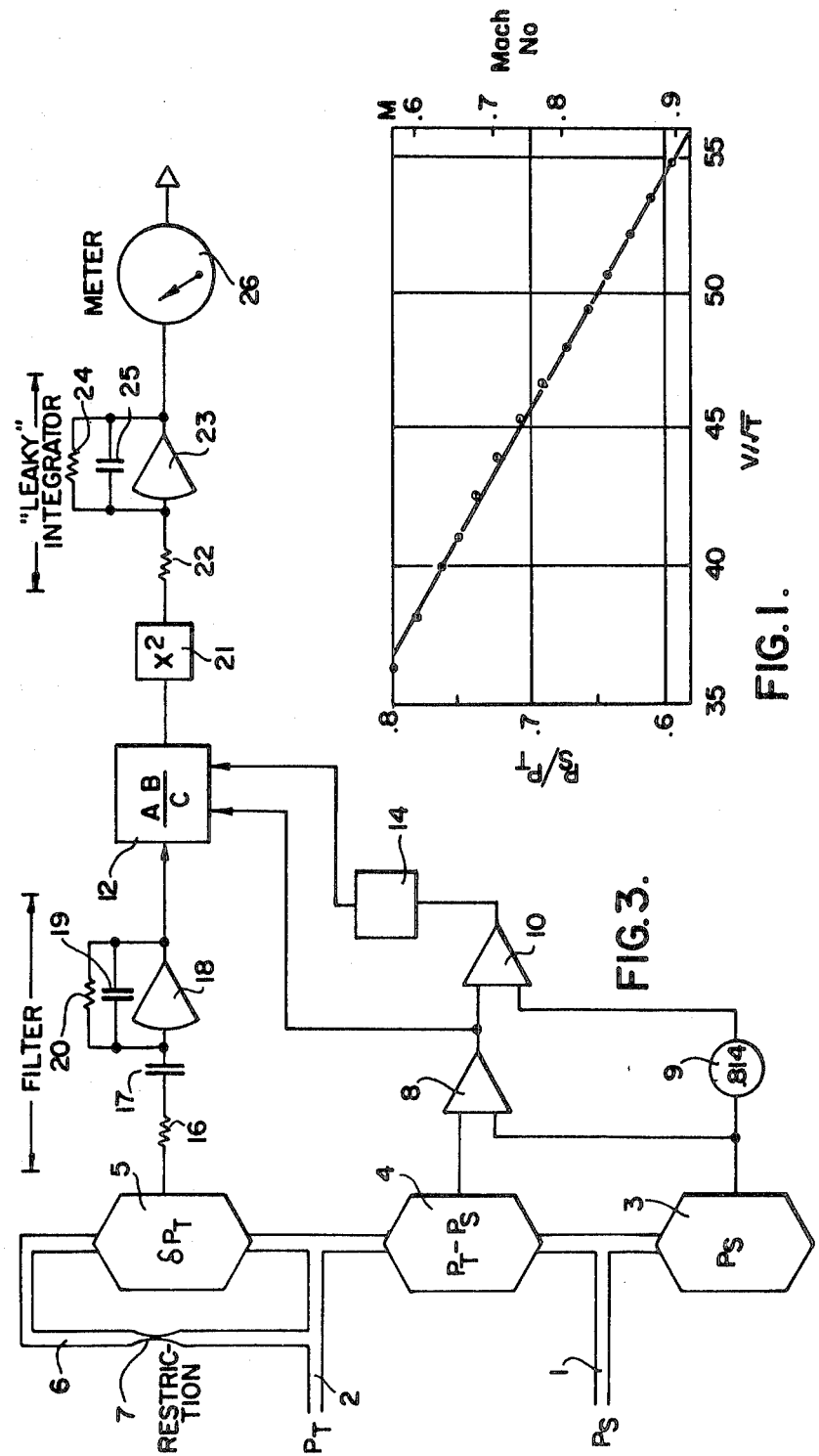

United States Patent

[11] 3,599,488

[72] Inventors Graeme K. Mather;
 Donald F. Daw, both of Ottawa, Ontario, Canada
[21] Appl. No. 17,758
[22] Filed Mar. 9, 1970
[45] Patented Aug. 17, 1971
[73] Assignee Canadian Patents and Development Limited
 Ottawa, Ontario, Canada

[54] APPARATUS FOR MEASURING AIR TURBULENCE ENCOUNTERED BY AIRCRAFT
 5 Claims, 3 Drawing Figs.

[52] U.S. Cl. ...................................................... 73/178
[51] Int. Cl. .................................................. G01c 21/00
[50] Field of Search ........................................... 73/178; 235/151.3

[56] References Cited
 UNITED STATES PATENTS
 3,272,974 9/1966 MacCready, Jr. ............ 73/178 X Primary Examiner—Donald O. Woodiel
Attorney—James R. Hughes ABSTRACT: Air turbulence encountered by an aircraft is measured according to the equation $$I \alpha \frac{P_T \cdot \delta P_T}{(P_T - K \cdot P_s)^2}$$

wherein, with respect to turbulent air through which an aircraft is passing, $I$ is a measure of the intensity of the longitudinal component of the turbulence, $P_s$ is the static air pressure, $P_T$ is the total air pressure, $\delta P_T$ is the fluctuation of the total air pressure, and $K$ is a function of the slope of a linear approximation to a graph of actual values for $$\frac{P_s}{P_T} \text{ versus } \frac{V}{\sqrt{T_T}},$$

where $V$ is the average true airspeed and $T_T$ is the total absolute temperature. A system for render a solution to the equation includes air pressure transducers on the aircraft for providing electrical signals corresponding to $P_T \cdot \delta P_T / (P_T - KP_s)^2$. The electrical signals corresponding to $P_T \cdot \delta P_T / (P_T - KP_s)^2$ are applied to the input of a leaky integrator circuit to render an average electrical signal indicative of an approximate measure of turbulence in terms of wind velocity.

APPARATUS FOR MEASURING AIR TURBULENCE ENCOUNTERED BY AIRCRAFT

This invention relates to an apparatus for measuring air turbulence encountered by aircraft.

A need has been expressed for a device that would provide a quantitative cockpit readout of air turbulence intensities experienced, particularly ky transport aircraft. In a U.S. Department of Commerce publication entitled "Report of the National Committee for Clear Air Turbulence to the Federal Coordinator for Meteorological Services and Supporting Research," Part 2, Dec. 1966, it is recommended that an aircraft turbulence measuring system be selected, installed in a representative cross section of types of aircraft, and implemented for daily operational use. It is also recommended that the instrumentation should provide the best available measure of turbulent intensity, to the greatest degree possible.

Such a measurement system should allow pilots to report the intensity of en route turbulence to other aircraft and to the appropriate air traffic control agency. This quantitative measurement must be relatively independent of aircraft type and speed.

It is an object of the invention to provide an apparatus for measuring the longitudinal component of air turbulence encountered by aircraft, the measurement being relatively independent of aircraft type and speed.

According to the invention there is provided an air turbulence measuring apparatus for aircraft, for providing a measure of the intensity of air turbulence according to the following equation, $$I_\alpha \frac{P_T \cdot \delta P_T}{(P_T - K \cdot P_s)^2}$$

wherein, with respect to turbulent air through which an aircraft is passing, $I$ is a measure of the intensity of the longitudinal component of the turbulence, $P_s$ is the static air pressure, $P_T$ is the total air pressure, $\delta P_T$ is the fluctuation of the total air pressure, and $K$ is a function of the slope of a linear approximation to a graph of actual values for $$\frac{P_s}{P_T} \text{ versus } \frac{V}{\sqrt{T_T}},$$

where $V$ is the average true airspeed and $T_T$ is the total absolute temperature, comprising air pressure to electrical signal transducing means for providing electrical signals corresponding to $P_s$, $P_T$, and $\delta P_T$, different amplifying and squaring means for deriving electrical signals corresponding to $(P_T - KP_s)^2$ from said signals corresponding to $P_s$ and $P_T$, multiplying and dividing means for deriving electrical signals corresponding to $P_T \cdot \delta P_T / (P_T - KP_s)^2$ from the signals corresponding to $P_T$, $\delta P_T$ and $(P_T - KP_s)^2$, means for deriving an average electrical signal from said signals from said multiplying and dividing means, and means for indicating the magnitude of said average signal as an approximate measure of said turbulence in terms of true gust velocities.

Figure 2:
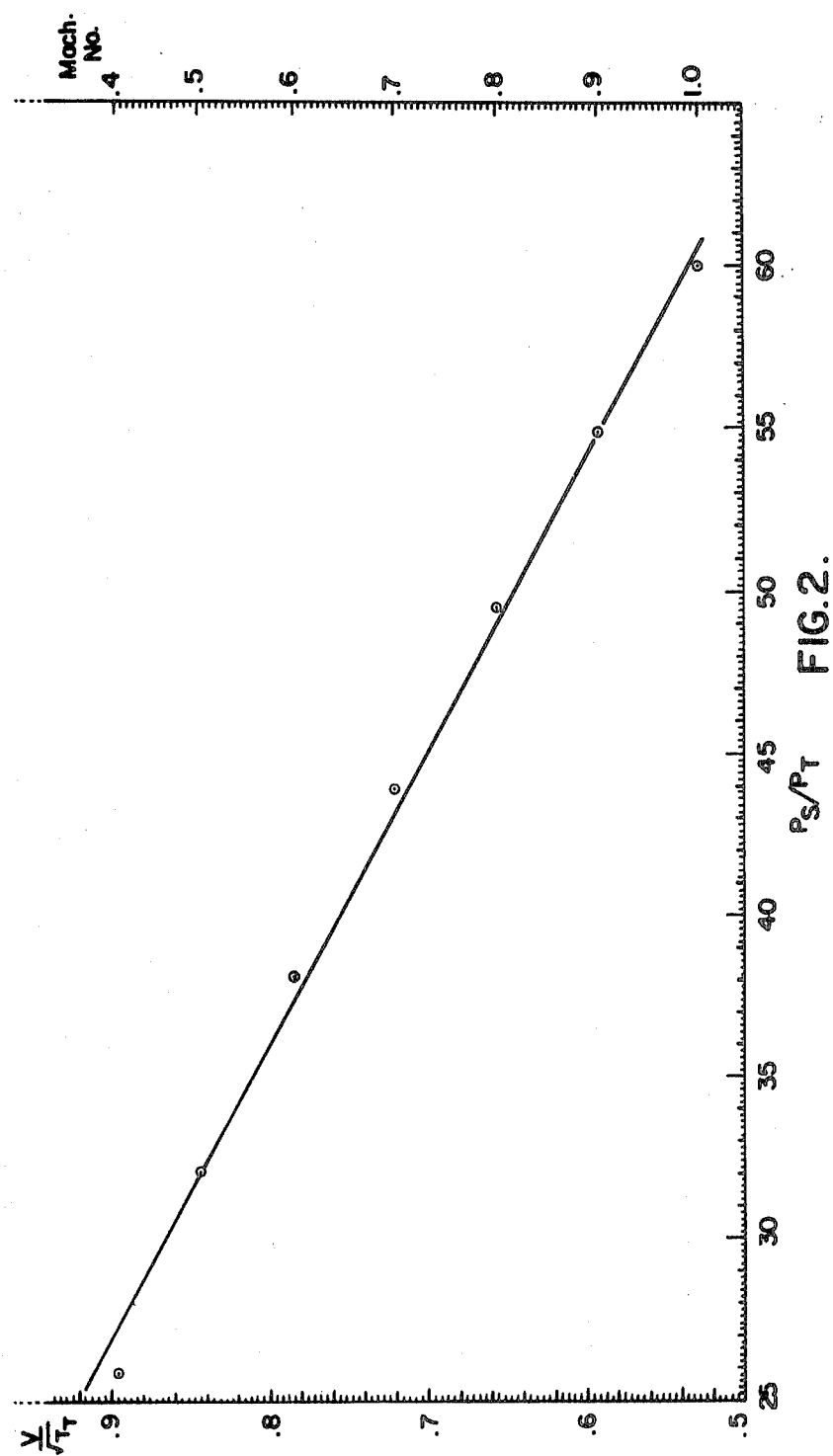

In the accompanying drawings;

FIG. 1 shows a graph from which one value for $K$ is derived for the invention, for an aircraft when travelling at different speeds in the Mach No. range 0.6 to 0.9, FIG. 2 is a similar graph to that shown in FIG. 1, for deriving another value for $K$ for an aircraft travelling at different speeds in the Mach No. range 0.4 to 1.0, FIG 3 shows, by way of example, a diagrammatic representation of a turbulence measuring apparatus for aircraft, as one embodiment of the invention.

It can be shown that in level, unaccelerated flight of an aircraft, using $\delta V/V$ as a measure of air turbulence in feet per second of gust velocity (1) $\delta V/V \approx RT_T/V^2 \cdot \delta P_T/P_T$ where $\delta V$ = true airspeed fluctuations (ft./sec.)
$T_T$ = total temperature (°k.)
$R$ = universal gas constant (ft./sec.)²/°K.
$\delta P_T$ = fluctuations in total pressure (p.s.f.)
$P_T$ = average total pressure (p.s.f.)
$V$ = average true airspeed (ft./sec.)

In the graph shown in FIG. 1 the ratio $P_s/P_T$ for an aircraft travelling at different speeds in the Mach No. range 0.6 to 0.9, where $P_s$ is the static pressure, is plotted against $V/T_T$. It will be seen from the graph that the actual values can be approximated by a straight line over the Mach range, which is the one of most interest, to present day transport. The formula representing a linear approximation to the graph can be written as, (2) $\quad 100(1.06P_T - 0.863P_s) = \dfrac{VP_T}{\sqrt{T_T}}$ which may be substituted in equation (1) to yield (3) $\quad \dfrac{\delta V}{V} \doteq \dfrac{RP_T \delta P_T}{10^4(1.06P_T - 0.863P_s)^2}$ $\doteq \dfrac{RP_T \delta P_T}{1.06 \times 10^4(P_T - 0.814 P_s)^2}$ or $I_\alpha \dfrac{P_T \delta P_T}{(P_T - 0.814 P_s)^2}$ where $I$ is a measure of the intensity of the longitudinal component of the turbulence.

Referring to FIG. 2 the formula representing the straight line can be written as (4) $\quad 100(1.092P_T - 0.9166P_s) = \dfrac{VP_T}{\sqrt{T_T}},$ and this may be substituted in equation (1) to yield (5) $\quad \dfrac{\delta V}{V} \doteq \dfrac{RP_T \delta P_T}{10^4(1.092P_T - 0.9166P_s)^2}$ $\doteq \dfrac{RP_T \delta P_T}{1.092 \times 10^4(P_T - 0.865 P_s)^2}$ or $I_\alpha \dfrac{P_T \cdot \delta P_T}{(P_T - 0.865 P_s)^2}$ From the equations (3) and (5) it will be seen that the formula for a linear approximation to the graph varies according to the Mach No. range in which a particular aircraft can travel, and so it may generally be written:

(6) $\quad I_\alpha \dfrac{RP_T \delta P_T}{(P_T - KP_s)^2}$

Thus for a reasonably accurate value for $I$ it is necessary for the value of $K$ to be deduced from what is considered to be a practical Mach No. range for all aircraft with which the invention is to be used. For different aircraft to give the same value for $I$ would need a Mach No. range, and thus a value for $K$, to be agreed upon internationally.

However, for present day commercial aircraft the Mach No. range would probably be chosen as either 0.6 to 0.9 or 0.4 to 1.0 or some range lying between these ranges.

Therefore, the electrical outputs of three transducers connected to sensors measuring $P_T$ or $P_T - P_s$ and $P_s$ can, according to the invention, be (i) squared to give an output corresponding to $V^2 P_T^2 / T_T$
(ii) divided to give an output corresponding to $P_T(T_T/V^2 P_T)$
(iii) multiplied by a sensitive device measuring the total head fluctuations ($T_T \delta P_T / V^2 P_T$) to produce essentially the relationship of equation (6) for the chosen value of $K \cdot R$ the universal gas constant can be incorporated in the calibration of the output. This electrical output can then be fed to an r.m.s., voltmeter with a band-pass between, say 0.1 and 10.0 cycles per second. The face of the voltmeter can be calibrated to read turbulence intensities in terms of feet per second over the bandwidth. All of the above computations may be performed with solid-state analogue components, and such an apparatus is shown in FIG. 3.

In FIG. 3 there is shown an apparatus comprising static pressure source 1 and pitot tube 2 for mounting in the side of an aircraft (not shown) and for obtaining $P_s$ and $P_T$ respectively. The static pressure source 1 and Pitot tube 2 are connected to the inputs of three transducers 3, 4 and 5 which transduce $P_s$, $P_T-P_s$, and $\delta P_T$ respectively to electrical signals. The static source 1 and Pitot tube 2, and transducers 3 an 4 conveniently are standard altimeter and airspeed equipment in an aircraft. The transducer 5 has a return outlet 6 provided with a restriction 7 to enable the transducer 5 to transduce $\delta P_T$ to an electrical signal. The transducer 5 is a sensitive differential pressure transducer with a range of ±72 pounds per square foot.

The output of the transducer 3 is connected to an operational amplifier 8 and a coefficient potentiometer 9, which may be a resistance dividing network. The electrical signal from the coefficient potentiometer 9 gives an output (in this instance for $K$) of 0.814 times the signal fed to it from the transducer 3, and this signal is passed to operational amplifier 10. The output from the operational amplifier 8 is connected to an input to the operational amplifier 10 and an input to a combination divider and multiplier 12. The output from the operational amplifier 10 is connected through a squaring circuit or squaring box 14 to an input to the combination divider and multiplier 12.

The output from the transducer 5 is connected to the combination divider and multiplier 12 via a filter network comprising a resistance 16, capacitor 17, operational amplifiers 18, capacitor 19, and resistance 20.

The combination divider and multiplier 12 is connected through a squaring box 21 to a "leaky" integrator circuit comprising a resistance 22, operational amplifier 23, resistance 24, capacitor 25. The output from the "leaky" integrator circuit is connected to a meter 26.

In operation the apparatus was arranged as shown in FIG. 3 with the transducers 3, 4 and 5 chosen to transduce from 0 to 2,160 p.s.f., 0 to 720 p.s.f., and as already stated ± 72 p.s.f. respectively. The restriction 7 was chosen to form a high pass filter having a time constant at least 1.6 seconds. The filter network components were chosen to have the following values, the resistances 16 and 20 are 100K, the capacitor 17 16μf., and the capacitor 0.16μf. The "leaky" integrator circuit components were chosen to have the following values resistances 22 and 24 100K, and capacitor 25 100μf.

When the aircraft was in flight within the Mach range 0.6 to 0.9 and passing through turbulent air electrical signals, which were produced in the transducers 3, 4 and 5 by the pressures in the static source 1 and the Pitot tube 2, were passed through the electrical circuitry shown in FIG. 2. The signal from transducer 3 is fed to the coefficient potentiometer 9 where 0.814 of the signal is passed on. The signal from transducer 3 is also passed to operational amplifier 8 together with a signal from transducer 4 so that a signal representing $-P_T$ is passed from operational amplifier 8 to operational amplifier 10, and to the combination divider and multiplier 12. A signal representing $P_T-0.814P_s$ is fed to the squaring box 14 which passes a signal representing $(P_T-0.814P_s)^2$ to the combination divider and multiplier 12.

The signal representing $\delta P_T$, from the transducer 5, is fed through the filter network comprising resistances 16 and 20, capacitors 17 and 19, and operational amplifier 18, from which the frequency components of 0.1 Hz. to 10 Hz. are filtered and passed to the combination divider and multiplier 12.

The above mentioned signals to the divider and multiplier 12 are used to pass a signal from the combination divider and multiplier 12 to a squaring circuit or squaring box 21, which signal is representative of $P_T \cdot \delta P_T/(P-0.814P)^2$. The squaring box 21 together with the "leaky" integrator circuit comprising resistances 22 and 24, capacitor 25, and operational amplifier 23, each have a time constant of ten seconds and are used to approximate the mean square value of the signal from the combined divider and multiplier. This mean square value is indicated on the dial of the meter 26 in feet per second gust velocity, in which the dial is calibrated.

Thus with the apparatus shown in FIG. 3, there is provided,
(a) means for obtaining the air pressures $P_s$ and $P_T$ in the form of the static air pressure source 1 and the Pitot tube 2,
(b) air pressure to electrical signal transducing means, for providing electrical signals corresponding to $P_s$, $P_T$ and $\delta P_T$ from said means for obtaining the air pressures $P_s$, and $P_T$, in the form of transducers 3, 4 and 5, and operational amplifier 8, wherein an electrical signal corresponding to $P_s$ is produced from transducers 3, an electrical signal corresponding to $P_T$ is produced from transducers 3 and 4 and operational amplifier 8 which for convenience gives in this embodiment a negative value for $P_T$, and an electrical signal corresponding to $\delta P_T$ is produced from transducer 5,
(c) amplifying and squaring means for deriving electrical signals corresponding to $(P_T-K \cdot P_s)^2$ from said signals corresponding to $P_s$ and $P_T$ in the form of operational amplifier 10 and squaring box 14,
(d) multiplying and dividing means for deriving electrical signals corresponding to $P_T \delta P_T/(P_T-KP_s)^2$ from the signals corresponding to $P_T$, $\delta P_T$ and $(P_T-KP_s)^2$ in the form of the combination divider and multiplier,
(e) means for deriving an average electrical signal from said signals from said multiplying and dividing means in the form of the squaring box 21, and the leaky integrator comprising resistances 23 and 24, capacitor, and
(f) means for indicating the magnitude of said average signal as an approximate measure of said turbulence in terms of wind velocity, in the form of the meter 26.

In the apparatus shown the static pressure source 1 and Pitot tube 2, transducers 3 and 4, were standard altimeter and airspeed equipment of an aircraft, and it was most economical to use this existing equipment. However, on some instances it may be necessary to provide the static pressure source 1 and Pitot tube 2 and transducers for the air turbulence device alone, in such circumstances the transducer 4 may be a transducer which produces a signal corresponding to $P_T$ only, and then the operational amplifier 8 may be omitted. In these circumstances the transducer 3 will only be connected to the coefficient potentiometer 9, and the transducer 4 will directly feed the operational amplifier 10 and the combination divider and multiplier, 12.

We claim:
1. An air turbulence measuring apparatus for aircraft, for providing a measure of the intensity of the longitudinal component of air turbulence with respect to the aircraft, according to the following equation,

$$I_\alpha \frac{P_T \cdot \delta P_T}{(P_T - K \cdot Ps)^2}$$

wherein, with respect to turbulent air through which an aircraft is passing, $I$ is a measure of the intensity of the longitudinal component of the turbulence, $P_s$ is the static air pressure, $P_T$ is the total air pressure $P_T$ is the fluctuation of the total air pressure, and $K$ is a function of the slope of a linear approximation to a graph of actual values for $$\frac{Ps}{P_T} \text{ versus } \frac{V}{\sqrt{T_T}}$$

where $V$ is the average true airspeed and $T_T$ is the total absolute temperature, comprising air pressure to electrical signal transducing means for providing electrical signals corresponding to $P_s$, $P_T$ and $\delta P_T$, different amplifying and squaring means for deriving electrical signals corresponding to $(P_T-K \cdot P_s)^2$ from said signals corresponding to $P_s$ and $P_T$, multiplying and dividing means for deriving electrical signals corresponding to $P_T \delta P_T/(P_T-KP_s)^2$ from the signals corresponding to $P_T$, $\delta P_T$ and $(P_T-KP_s)^2$, means for deriving an average electrical signal from said signals from said multiplying and dividing means, and means for indicating the magnitude of said average signal as an approximate measure of said turbulence in terms of wind velocity.

2. Apparatus according to claim 1, wherein $K$ is within the range 0.814, for aircraft capable of travelling within the Mach No., range 0.6 to 0.9, to 0.865 for aircraft capable of travelling within the Mach No. range 0.4 to 1.0.

3. Apparatus according to claim 1, wherein said transducing means for providing said electrical signal corresponding to $P_T$, comprises a transducer for providing a signal corresponding to $P_T-P_s$, and an operational amplifier connected to each said transducing means for producing signals corresponding to $P_s$ and $P_T-P_s$.

4. Apparatus according to claim 1, which further comprises a filtering circuit for filtering signals within the frequency range 0.1 Hz. to 10.0 Hz. from said transducer for producing a signal corresponding to $\delta P_T$, and said filtered signals are passed to said multiplying and dividing means.

5. Apparatus according to claim 1, wherein said means for deriving an average electrical signal, comprises a squaring circuit and a "leaky" integrator having a predetermined time constant to approximate the mean square value of the signal passed thereto from said multiplying and dividing means.